Nov. 22, 1955                H. O. WILLIAMS                2,724,417
HACKSAW WITH SPRING PRESSED BLADE SUPPORTING GUIDE
Filed Dec. 5, 1952
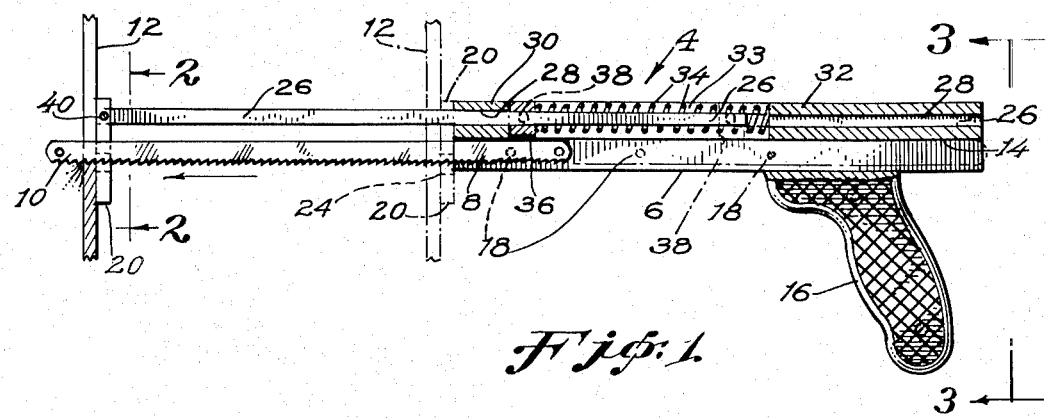
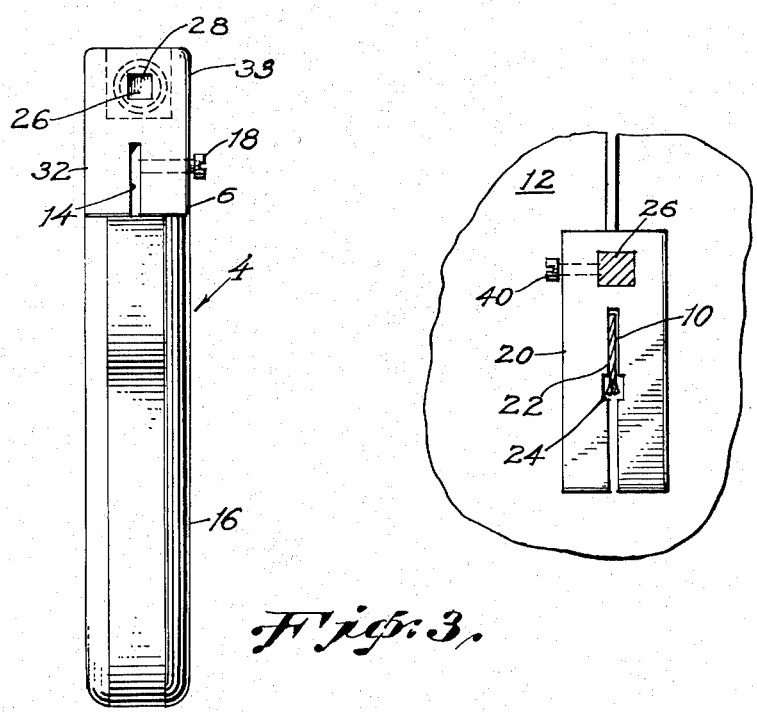
INVENTOR
HAROLD O. WILLIAMS
BY
ATTORNEYS

United States Patent Office 2,724,417
Patented Nov. 22, 1955

2,724,417

HACKSAW WITH SPRING PRESSED BLADE SUPPORTING GUIDE

Harold O. Williams, Napa, Calif.

Application December 5, 1952, Serial No. 324,431

2 Claims. (Cl. 145—31)

(Granted under Title 35, U. S. Code (1952), sec. 266)

This invention relates to hand saws, and, more particularly, to a type of hack saw frequently referred to as a key-hole or pad saw.

This invention may be manufactured and used by or for the Government of the United States of America for governmental purposes without the payment of any royalties thereof or therefor.

Saws of this type are adapted primarily for use in closely confined areas where space will not permit the use of the larger U brace of the conventional hack saw, these saws being formed fundamentally of a holder in which is secured an elongated blade capable of being worked in the confined areas. The holder in turn is provided with a convenient handle, such as a pistol grip, to permit the blade to be reciprocated back and forth across the work, and customarily the saws include blade-guiding means which, preferably, are channeled-shaped with the legs of the channel closely spaced from opposite sides of the blade. Further, these guides are reciprocably mounted on the holder so that when the saw is thrust through the work the guides engage the work and provide lateral support for that portion of the blade which is doing the cutting. Suitable spring means normally are provided to maintain the engagement of the guides with the work as the saw is retracted or withdrawn in its return stroke. Saws constructed in such a manner have been generally satisfactory for use in most of the work for which they are specifically intended, although such prior art structures as have been noted appear unnecessarily large, awkward and complicated.

However, such saws do exhibit several disadvantages, one of which is that, when there happens to be a wall or some other abutment disposed in relatively close proximity to the work, it is difficult for the operator to so judge the length of his stroke that the end of his blade will not strike this wall and buckle. Of course, if the blade strikes the wall or the abutment with sufficient force, breakage may result or the blade may be so twisted as to bind or snap.

A further disadvantage of these prior key-hole saws is that, regardless of the type of work to be done, the blades are fixed in a fully extended position. As a result, excessively long saw blades frequently were used to perform the work and such excessive length materially reduced the ease and the speed by which the work could be accomplished. As can easily be appreciated, any extent of the blade which is not used in the actual cutting stroke simply serves to increase the possibility of the blade being buckled, and, for this reason alone, the prior use of such unnecessarily long blades is an inefficient practice.

Accordingly, a principal object of the present invention is to provide a hand saw in which the length of the cutting stroke is adjustably controllable in such a fashion that the thrust stroke of the saw can be limited to prevent the end of the saw blade from striking objects lying in proximity to and beyond the object being cut.

An ancillary object is to provide such a saw with a blade that is adjustable to the extent that the length of the portion which projects outwardly of the handle can be varied to suit the particular job to be done.

A further object, which is related to the last object, is to provide such an adjustable blade with adjustable guiding means capable of being positioned in a proximity to the end of the blade.

Further objects are to provide a hand saw which is simple and inexpensive to manufacture, efficient in operation and unusually small and compact in size.

These and other objects will become apparent in the accompanying drawing.

According to the invention, the saw is formed with a blade that is adjustably mounted in a holder portion, this holder, preferably, being provided with a longitudinally-extending slot which is sufficiently long to receive at least a major portion of the blade. Suitable locking means are provided to secure the blade in any adjusted position in the holder so that, as may be appreciated, suitable adjustments in the portion of the blade which extends outwardly of the holder can be made for any particular job. For instance, if a short-cutting stroke is required to avoid striking the end of the blade against proximate obstructions, the extending portion of the blade can be reduced to the extent required.

In addition, the saw includes blade-guiding means most suitably adapted to closely straddle the end of the blade and provide such lateral support as will hold the blade rigid during the cutting. These guide means, preferably, are mounted on a guide rod which, in turn, is reciprocably supported in the holder above and in a spaced parallel relationship with the blade. The guided rod further mounts resilient means functioning to urge the guide to an outward position in which it straddles the outer end of the blade, and suitable means also are provided to adjust the outer position of this guide in accordance with the adjusted position of the blade.

In operation, when cutting is commenced, the guide engages the work and, during the thrust stroke of the saw, the guide reciprocates relatively to the blade until the guide engages the end of the holder. Such engagement constitutes the outward limit of the stroke and, consequently, one manner of adjusting the stroke is by adjusting the position of the guide. Of course, the stroke, as previously described, also is limited by reducing the outwardly extending length of the blade, and it is this latter adjustment which is beneficial in avoiding the striking of obstructions. When the saw is withdrawn in its return stroke, the spring pressure developed during the thrust automatically causes the guide to maintain engagement with the work and provides its lateral support for the blade.

The preferred embodiment of the invention is illustrated in the accompanying drawings of which Fig. 1 is a longitudinal central section through the saw, Fig. 2 a section taken along line 2—2 of Fig. 1 and Fig. 3 a section taken on line 3—3 of Fig. 1.

Referring to the drawings a saw 4 is formed of holder or support 6 on which is rigidly mounted a removable saw blade 8, which may be of the type used in conventional hack saws, the blade having a free end 10 extending from the support in position to cut a work piece 12. To provide a suitable housing, as well as a lateral support for the blade, the holder preferably is longitudinally slotted at 14 to a depth greater than the width of the blade to prevent the teeth of the housed blade from projecting beyond the holder and injuring the hand of the user as the holder is gripped by a pistol type handle 16.

A principal feature of this invention resides in constructing slot 14 in the holder of a sufficient length to receive and fixedly support any position of the blade, enabling free end 10 of the blade to be shortened for installations where there is insufficient clearance on the back side of the work piece for the normal operating blade lengths. The saw operator is relieved of the obligation of holding back on his pressure stroke, which might otherwise break or buckle the blade by abutment with the obstruction in its path. Furthermore, it has been found desirable in most sawing operations to utilize a small working blade length as it reduces the stroke length and fatigue to the operator, and eliminates the necessity of supporting the entire length of the blade as will be hereinafter described.

As a matter of convenience, in mounting the blade on the holder, as well as a manufacturing expedient, slot 14 may extend longitudinally throughout the holder. To avoid the possibility of the blade extending rearwardly beyond the holder and injuring the hand of the user, which may arise when a small length of the free end is being used, the holder may be constructed substantially the same length as the blade, in which case the holder provides a compact stowage for the entire blade in a readily accessible position when the need arises. One or more set screws 18 may be provided spaced along the holder and transversely extending into slot 14 for locking the blade in any adjusted position.

Free blade end 10 is laterally supported as it passes through the work piece by a guide 20 having a narrow recess 22 of a width sufficient to permit the free passage of the blade, this recess being widened into a channel 24 to accommodate the splayed teeth of the blade.

Guide 20 is supported reciprocably in the holder by an arm 26, slidably extending through longitudinally aligned apertures 28 in spaced shoulders 30 and 32. The apertures may extend for a length to completely house the arm similarly as blade 8 may be accommodated in slot 14. Arm 26 and apertures 28 may be made non-circular in cross section or keyed in a well-known manner to prevent the arm from rotating and twisting the blade end 10 as the arm is reciprocated. The intermediate space between shoulders forms a housing 33 for a resilient member 34, such as a coiled compression spring, through which arm 26 extends axially and is fixed thereto by a bushing 36 forming a seat for the forward end of the spring. The bushing is restricted in movement between the shoulders and it is obvious that housing 33 must be of a length to provide the maximum desired stroke of the guide and the blade which it supports. The coil spring maintains the guide in an outermost position from the holder and against work piece 12 by forcing bushing 36 toward shoulder 30 where it is restricted from further outward movement. A detachable cover, not shown, may be mounted on the support to form an enclosure for the spring and protect the sliding parts from the effects of the weather and the spring from pinching the hands of the operator.

Since the length of the blade end 10 is made adjustable, for reasons previously described, the length of the guide arm 26 must be made correspondingly adjustable, and accordingly, bushing 36 is slidably mounted on the arm and provided with a locking screw 38 by which the bushing may be fixed to the arm at a position where guide 20 will be adjacent the tip of the adjusted blade. Guide 20 may be made detachable from the end of the arm by a set screw 40, permitting the substitution of an interchangeable guide, not shown, such as one with a concave leading surface for engaging the periphery of a pipe to be cut.

Another feature of the invention resides in the compact arrangement of the tool achieved by extending guide arm 26 in a substantially parallel and spaced from the longitudinal edges of the blade, and by extending the guide arm radially through the coil spring. Thus the spring may be positioned offset from the blade in an overlapping relation which materially reduces the overall length of the saw as compared to prior art construction where the guide arm formed a support for the entire blade and the spring was arranged as a longitudinal extension thereof. I can obtain a more compact tool because in my invention the guide arm need not form a lateral support for the entire free end of the blade between the guide and the holder as the blade seldom need be adjusted to a length where an additional lateral support is required.

The operation of the saw is obvious from the above description. The length of the extending portion of the blade and the guide arm may be adjusted according to the available space that is present on the remote side of the work piece. The guide is positioned by the operator against the work piece at the point to be cut and the saw reciprocated in a conventional manner. During the forward stroke of the saw, the guide is moved rearwardly and continuously provides lateral support for the blade portion passing through the work and the return spring is compressed between the bushing and the shoulder until the stroke is limited by the abutment of the guide with the forward edge of the support, shown by broken lines in Fig. 1. At the start of the back stroke of the saw, the compressed spring is released and forces the guide outwardly and resiliently against the work where it laterally supports the blade adjacent the work as it does in the forward stroke of the saw.

By this invention a saw is provided with a blade having a working end adjustable in length which may be regulated in accordance to space limitations for the blade or for purposes of blade conservation. As only a short stroke is desired in most operations, notwithstanding the availability of space, conservation may be practiced by using only a small portion of the blade at a time which it may be snapped off when dull and a fresh portion of the blade moved into position. The guide functions to support the blade laterally adjacent the work piece during both forward and return strokes, and for all the various positions that the blade may be adjusted. It is apparent that the forward end of the holder functions inherently as a limit stop in the forward stroke of the saw and enables the objects of the invention to be accomplished. As a short saw stroke may be used advantageously, additional lateral support for the remaining position of the free end of the saw is not necessary, resulting in a substantial savings in the overall length of the saw. A reduction in the size of the saw, without reducing the size of the saw blade, results in a saw which is easier for the operator to support, and is more compact for use in close quarters.

Obviously many modifications and variations of the present invention are possible in the light of the above teachings. It is, therefore, to be understood that within the scope of the appended claims the invention may be practiced otherwise than as specifically described.

I claim:

1. A holder comprising an elongate saw blade, an elongate holder having front and rear ends and being provided with means for adjustably receiving said blade in a plurality of fixed positions with varying operative free extents of the blade projecting outwardly from its front end, a guide rod slidably mounted in said holder and having a free extent projecting outwardly from said holder front end, blade-guiding means mounted on the free extent of said rod, and resilient means for urging said rod outwardly along the free extent of the blade, said resilient means including a compressible member mounted on said rod within said holder, a pair of front and rear compression shoulders carried by the holder, and a stop-block adjustably mounted on said rod between said shoulders, said member being compressible between said block and said rear shoulder and said block being adjustable for permitting the free extent of the rod to be varied in conformity with the free extent of the blade, whereby said free extents of the blade and rod can be rendered substantially coextensive.

2. A holder comprising an elongate saw blade, an elongate blade holder having front and rear ends and being provided with means for adjustably receiving said blade in a plurality of fixed positions with varying operative free extents of the blade projecting outwardly from its front end, a guide rod slidably mounted in said holder and having a free extent projecting outwardly from said holder front end, blade-guiding means mounted on the free extent of said rod, and resilient means for urging said rod outwardly along the free extent of the blade, said resilient means including a compressible member mounted on said rod within said holder, a pair of front and rear compression shoulders carried by the holder, and a stop-block adjustably mounted on said rod between said shoulders, said member being compressible between said block and said rear shoulder and said block being adjustable for permitting the free extent of the rod to be varied in conformity with the free extent of the blade, whereby said free extents of the blade and rod can be rendered substantially co-extensive, said holder being approximately the same length as said blade for permitting substantially the full length of the blade to be received within it.

References Cited in the file of this patent

UNITED STATES PATENTS

| | | |
|---|---|---|
| 2,143,981 | Harding | Jan. 17, 1939 |
| 2,525,235 | Myers | Oct. 10, 1950 |

FOREIGN PATENTS

| | | |
|---|---|---|
| 512,611 | Great Britain | Sept. 21, 1939 |
| 952,930 | France | Nov. 28, 1949 |